UNITED STATES PATENT OFFICE.

LUIGI CHIOZZA, OF CERVIGNANO, AUSTRIA, ASSIGNOR TO ARNO BEHR, OF JERSEY CITY, NEW JERSEY.

SUBSTITUTE FOR COFFEE.

SPECIFICATION forming part of Letters Patent No. 252,429, dated January 17, 1882.

Application filed August 8, 1881. (No specimens.)

*To all whom it may concern:*

Be it known that I, LUIGI CHIOZZA, of Cervignano, Austria, have invented an Improved Article of Diet Produced from Corn, of which the following is a specification.

This invention is based upon the discovery that by a process of isolating and roasting either the germs or the hulls of maize they are made to develop an agreeable aroma and taste, which render an infusion or decoction of them, when so prepared, suitable for use as an article of diet. For use as an infusion or decoction the roasted germs and hulls may be mixed in any desired proportions; or the roasted germs alone may be used, in which latter case some portion of the fat may, if preferred, be previously extracted from the germs, either before or after they are roasted.

In carrying out the process the first step is to separate the germs and hulls, which is effected by soaking the maize in hot water, or in a weak solution of sulphurous acid, until the grain is properly softened and the germs are rendered tough and elastic, so that when the maize is crushed between rollers the mealy portion is separated from the hulls and the germs come out whole, or in comparatively large pieces. The crushed maize is run over a riddle or sieve and washed with water. The mealy portions are washed through the sieve and collected in a tank for use in the manufacture of starch and other products. The germs and hulls are collected from the surface of the sieve, and are either dried and separated from each other in a winnowing-machine, or they may be immediately separated by immersing them in a menstruum composed of, for example, sugar and water of a density of from 10° to 12° Baumé, in which the hulls will sink, but from which the germs, which float upon the surface, may be readily removed by skimming or otherwise. Having isolated the germs, they are next dried and then ground and screened, in order to separately collect particles of uniform size preparatory to roasting. The next step is to roast the ground germs, the coarser grains being roasted by themselves and the finer grains by themselves, for the purpose of securing uniformity in the result.

The roasting process is conducted by any of the usual methods of roasting—as, for example, in a heated rotating cylinder, and is continued until the grains acquire a full brown color.

The grinding operation may be facilitated by partially roasting the germs before grinding them and completing the roasting operation after they are ground.

Substantially the same process is pursued with the hulls—that is, they are dried, partially roasted, ground, and then completely roasted, with the same precautions.

The germs contain a comparatively large percentage of fat, and if the roasted germs alone are to be used it may be preferred to extract a portion of their fat, which can be done, either before or after roasting, by pressing them, or by any of the usual methods; or a similar effect may be attained by mixing with the roasted germs any desired proportion of the roasted hulls, which differ from the germs in containing very little fat. The roasted germs and roasted hulls are now ready for the market, and are in condition to form the base of a palatable infusion or decoction, suitable for use as an article of diet.

The aroma and taste of the product can be pleasantly modified, and to some extent intensified, by moistening the germs before roasting with a small quantity of methylic alcohol containing tannin in solution, and adding sugar or glucose or caramel.

The methylic alcohol may be used in the proportion of from five to fifteen per cent., by weight, of the germs, and the amount of tannin in the solution may be from one half to five per cent., by weight, of the germs. The quantity of sugar, glucose, or caramel may also be varied according to the taste of the compounder. The roasted germs, however, are in all cases the principal source of the agreeable flavor, and to their presence is chiefly due the usefulness of the product as an article of diet.

What I claim as my invention is—

As an improved article of diet, the germs and hulls of maize isolated from the grain and from each other, and respectively roasted to a full brown color for use, either separately or mixed together in any desired proportions, as the base of a decoction or infusion, substantially as herein set forth.

LUIGI CHIOZZA.

Witnesses:
JAS. GEDDES, Jr.,
GUISTO SUVICH.